United States Patent
Zhang et al.

(10) Patent No.: US 10,154,014 B2
(45) Date of Patent: Dec. 11, 2018

(54) METHOD AND SYSTEM FOR EFFICIENT ENCRYPTION, TRANSMISSION, AND DECRYPTION OF VIDEO DATA

(71) Applicant: Alibaba Group Holding Limited, George Town, Grand Cayman (KY)

(72) Inventors: Qi Zhang, Hangzhou (CN); Didi Yao, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 88 days.

(21) Appl. No.: 15/240,644

(22) Filed: Aug. 18, 2016

(65) Prior Publication Data
US 2017/0054697 A1    Feb. 23, 2017

(30) Foreign Application Priority Data
Aug. 21, 2015 (CN) .......................... 2015 1 0516415

(51) Int. Cl.
H04L 29/06        (2006.01)
G09C 5/00         (2006.01)
H04N 21/00        (2011.01)

(52) U.S. Cl.
CPC ............ H04L 63/0457 (2013.01); G09C 5/00 (2013.01); H04N 21/00 (2013.01)

(58) Field of Classification Search
CPC ....... H04L 63/0457; G09C 5/00; H04N 21/00
See application file for complete search history.

(56) References Cited

U.S. PATENT DOCUMENTS

| | | | |
|---|---|---|---|
| 9,323,901 B1 | 4/2016 | Nair | |
| 2005/0259825 A1 | 11/2005 | Trifonov | |
| 2006/0026693 A1 | 2/2006 | Bade | |
| 2007/0016794 A1 | 1/2007 | Harrison | |
| 2007/0076889 A1 | 4/2007 | Derobertis | |
| 2007/0147292 A1 | 6/2007 | Van Ewijk | |
| 2008/0114983 A1 | 5/2008 | Sherkin | |

(Continued)

FOREIGN PATENT DOCUMENTS

| | | |
|---|---|---|
| EP | 0962070 | 12/1999 |
| WO | 2012098543 | 7/2012 |

(Continued)

OTHER PUBLICATIONS

Network Working Group, Request for Comments 3550, IETF Jul. 2003, pp. 1-89 (see esp. p. 8) (Year: 2003).*

*Primary Examiner* — Benjamin E Lanier
*Assistant Examiner* — Paul E Callahan
(74) *Attorney, Agent, or Firm* — Shun Yao; Park, Vaughan, Fleming & Dowler LLP

(57) ABSTRACT

One embodiment provides a system for efficiently and securely encrypting, transmitting, and decrypting video data, including selective encryption of image frames. During operation, the system obtains by a content-transmitting device, an image frame which is used to form a video stream. In response to determining that the image frame satisfies a predetermined condition for encryption, the system encrypts the image frame based on an encryption algorithm. The system encapsulates the encrypted image frame based on encapsulation information. The system includes encryption identification information for the image frame in the encapsulation information.

20 Claims, 9 Drawing Sheets

(56) References Cited

U.S. PATENT DOCUMENTS

| | | | |
|---|---|---|---|
| 2008/0123859 A1 | 5/2008 | Mamidwar | |
| 2008/0165973 A1 | 7/2008 | Miranda Gavillan | |
| 2008/0219449 A1 | 9/2008 | Ball | |
| 2009/0034733 A1 | 2/2009 | Raman | |
| 2009/0092252 A1 | 4/2009 | Noll | |
| 2009/0106551 A1 | 4/2009 | Boren | |
| 2009/0204812 A1* | 8/2009 | Baker | H04L 65/607 713/160 |
| 2009/0271634 A1 | 10/2009 | Boult | |
| 2010/0211787 A1 | 8/2010 | Bukshpun | |
| 2010/0265077 A1 | 10/2010 | Humble | |
| 2011/0069972 A1 | 3/2011 | Wiseman | |
| 2011/0231615 A1 | 9/2011 | Ober | |
| 2012/0177201 A1 | 7/2012 | Ayling | |
| 2012/0250863 A1 | 10/2012 | Bukshpun | |
| 2012/0265892 A1 | 10/2012 | Ma | |
| 2013/0083926 A1 | 4/2013 | Hughes | |
| 2013/0101119 A1 | 4/2013 | Nordholt | |
| 2013/0227286 A1 | 8/2013 | Brisson | |
| 2013/0251145 A1 | 9/2013 | Lowans | |
| 2014/0259138 A1 | 9/2014 | Fu | |
| 2014/0281511 A1 | 9/2014 | Kaushik | |
| 2014/0331050 A1 | 11/2014 | Armstrong | |
| 2014/0351915 A1 | 11/2014 | Otranen | |
| 2015/0046709 A1 | 2/2015 | Anspach | |
| 2015/0181308 A1* | 6/2015 | Ducharme | H04N 21/23476 380/210 |
| 2015/0236852 A1 | 8/2015 | Tanizawa | |
| 2015/0288542 A1 | 10/2015 | Ashrafi | |
| 2015/0381363 A1 | 12/2015 | Teixeira | |
| 2016/0021068 A1 | 1/2016 | Jueneman | |
| 2016/0226846 A1 | 8/2016 | Fu | |
| 2016/0241396 A1 | 8/2016 | Fu | |
| 2016/0248581 A1 | 8/2016 | Fu | |
| 2016/0294783 A1 | 10/2016 | Piqueras Jover | |

FOREIGN PATENT DOCUMENTS

| | | |
|---|---|---|
| WO | 2013026086 | 2/2013 |
| WO | 2016070141 | 5/2016 |

* cited by examiner

RTP HEADER 400

| BIT OFFSET | 0-1 | 2 | 3 | 4-7 | 8 | 9-15 | 16-31 |
|---|---|---|---|---|---|---|---|
| 0 | V 402 | P 404 | X 406 | CC 408 | M 410 | PT 412 | SEQUENCE NUMBER 414 |
| 32 | TIMESTAMP 416 ||||||||
| 64 | SSRC 418 ||||||||
| 96 | CSRC 420 ||||||||

FIG. 4

RTP EXTENSION HEADER 500

| BIT OFFSET | 0-1 | 2 | 3 | 4-7 | 8 | 9-15 | 16-31 |
|---|---|---|---|---|---|---|---|
| 96+32*CC | PROFILE-SPECIFIC EH IDENTIFIER 502 |||||| EH LENGTH 504 |
| 128+328CC | EXTENSION HEADER 506 |||||||

FIG. 5

METHOD AND SYSTEM FOR EFFICIENT ENCRYPTION, TRANSMISSION, AND DECRYPTION OF VIDEO DATA

RELATED APPLICATION

Under 35 U.S.C. 119, this application claims the benefit and right of priority of Chinese Patent Application No. 201510516415.9, filed 21 Aug. 2015.

BACKGROUND

Field

This disclosure is generally related to video encryption. More specifically, this disclosure is related to a method and system for efficiently and securely encrypting, transmitting, and decrypting image frames of a video stream based on selective encryption.

Related Art

The progress of technology includes the communication of increasing amounts of data. In the field of video streaming, in order to play video data in a remote and synchronous manner, a remote device can output images to a local device. The remote device may be a content-transmitting device, and the local device may be a content-receiving device. The remote and local devices can include a desktop computer, a mobile device such as a laptop or tablet, an embedded device, a smart television, or other computing device. In a current method of video data transfer, the transmitting device can perform data encapsulation in real time on image frames, and transmit the encapsulated image frames to the receiving device as a video stream. The receiving device can subsequently decapsulate the encapsulated image frames of the video stream to continuously display the video stream on a local display of the receiving device. In order to reduce the volume of the data transmission, the transmitting device may also encode the image frame before encapsulating and transmitting the image frame, and the receiving device may decapsulate and decode the image frame.

In a system based on, e.g., the Linux Framebuffer technology, two encryption methods may be used. In the first method, no encryption is used. The transmitting device obtains an image frame from a Framebuffer, performs video encoding and packet encapsulation, and transmits the image frame to the receiving device as an IP data packet, where no encryption process is performed. In the second method, encryption can occur at the transmission layer. The encapsulated image frame is encrypted and subsequently transmitted (e.g., based on an SSL protocol). However, in the first method (no encryption), if the transmitted data is intercepted by a malicious entity, the transmitted data may be easily obtained, which may result in a leak of private or confidential information. Furthermore, in the second method (encryption at the transmission layer), the transmitting device must encrypt each encapsulated and possibly encoded image frame, and the receiving device must decrypt each image frame. This may result in a decreased efficiency in the system.

SUMMARY

One embodiment provides a system for efficiently and securely encrypting, transmitting, and decrypting video data, including selective encryption of image frames. During operation, the system obtains by a content-transmitting device, an image frame which is used to form a video stream. In response to determining that the image frame satisfies a predetermined condition for encryption, the system encrypts the image frame based on an encryption algorithm. The system encapsulates the encrypted image frame based on encapsulation information. The system includes encryption identification information for the image frame in the encapsulation information.

In some embodiments, in response to obtaining the image frame, the system encodes the image frame. The system determines that the image frame satisfies the predetermined condition for encryption by determining that the encoded image frame satisfies the predetermined condition for encryption, and the system encrypts the image frame by encrypting the encoded image frame.

In some embodiments, the system transmits the encapsulated image frame to a content-receiving device, which causes the content-receiving device to: receive the encapsulated image frame; decapsulate the encapsulated image frame to obtain encryption identification information; and, in response to determining, based on the encryption identification information, that the image frame is encrypted, decrypt the encrypted image frame based on a decryption algorithm.

In some embodiments, the encryption identification information indicates the encryption algorithm used by the content-transmitting device to encrypt the image frame, and the decryption algorithm corresponds to the indicated encryption algorithm.

In some embodiments, the system encapsulates the encrypted image frame based on a Real-time Transport Protocol (RTP). The system includes in a corresponding RTP extension header for the encrypted image frame the encryption identification information for the image frame by setting extension bits of the corresponding RTP extension header.

In some embodiments, the encryption identification information indicates one or more of: whether the image frame is encrypted; and the predetermined encryption algorithm used by the content-transmitting device to encrypt the image frame.

In some embodiments, the system inserts an encryption indicator into the image frame based on a predetermined function. The system determines that the image frame satisfies the predetermined condition for encryption based on the encryption indicator.

In some embodiments, the encryption algorithm is one or more of: a Data Encryption Standard (DES) algorithm; a Triple Data Encryption Standard (3DES) algorithm; a Rivest Cipher 2 (RC2) algorithm; a Rivest Cipher 4 (RC4) algorithm; an International Data Encryption Algorithm (IDEA) algorithm; and an Advanced Encryption Standard (AES) algorithm.

Another embodiment provides a system for efficiently and securely decrypting video data, including decryption of selectively encrypted image frames. During operation, the system receives, by a content-receiving device, a data packet which is an image frame of a video stream, wherein the data packet is encapsulated. The system decapsulates the encapsulated data packet to obtain the image frame and corresponding encapsulation information. The system extracts encryption identification information from the encapsulation information of the image frame. In response to determining, based on the encryption identification information, that the image frame is encrypted, the system decrypts the encrypted image frame based on a decryption algorithm. The system outputs the decrypted image frame to a frame buffer, which displays the image frame on a display of the content-receiving device or the system.

In some embodiments, in response to determining that the decapsulated image frame is encoded, the system decodes the encoded image frame to obtain the image frame and the corresponding encapsulation information. The system extracts the encryption identification information by extracting the encryption identification information from the encapsulation information of the decoded image frame.

In some embodiments, the encryption identification information indicates an encryption algorithm used by a content-transmitting device to encrypt the image frame, and the decryption algorithm corresponds to the indicated encryption algorithm.

In some embodiments, the encapsulated data packet is encapsulated based on a Real-time Transfer Protocol (RTP), and a corresponding RTP extension header for the encrypted image frame includes the encryption identification information for the image frame based on extension bits of the corresponding RTP extension header.

In some embodiments, the system extracts the encryption identification information based on a predetermined function.

BRIEF DESCRIPTION OF THE FIGURES

FIG. 4 presents an exemplary format of an RTP header, in accordance with an embodiment of the present application.

FIG. 5 presents an exemplary format of an RTP extension header, in accordance with an embodiment of the present application.

In the figures, like reference numerals refer to the same figure elements.

DETAILED DESCRIPTION

Figure 1:
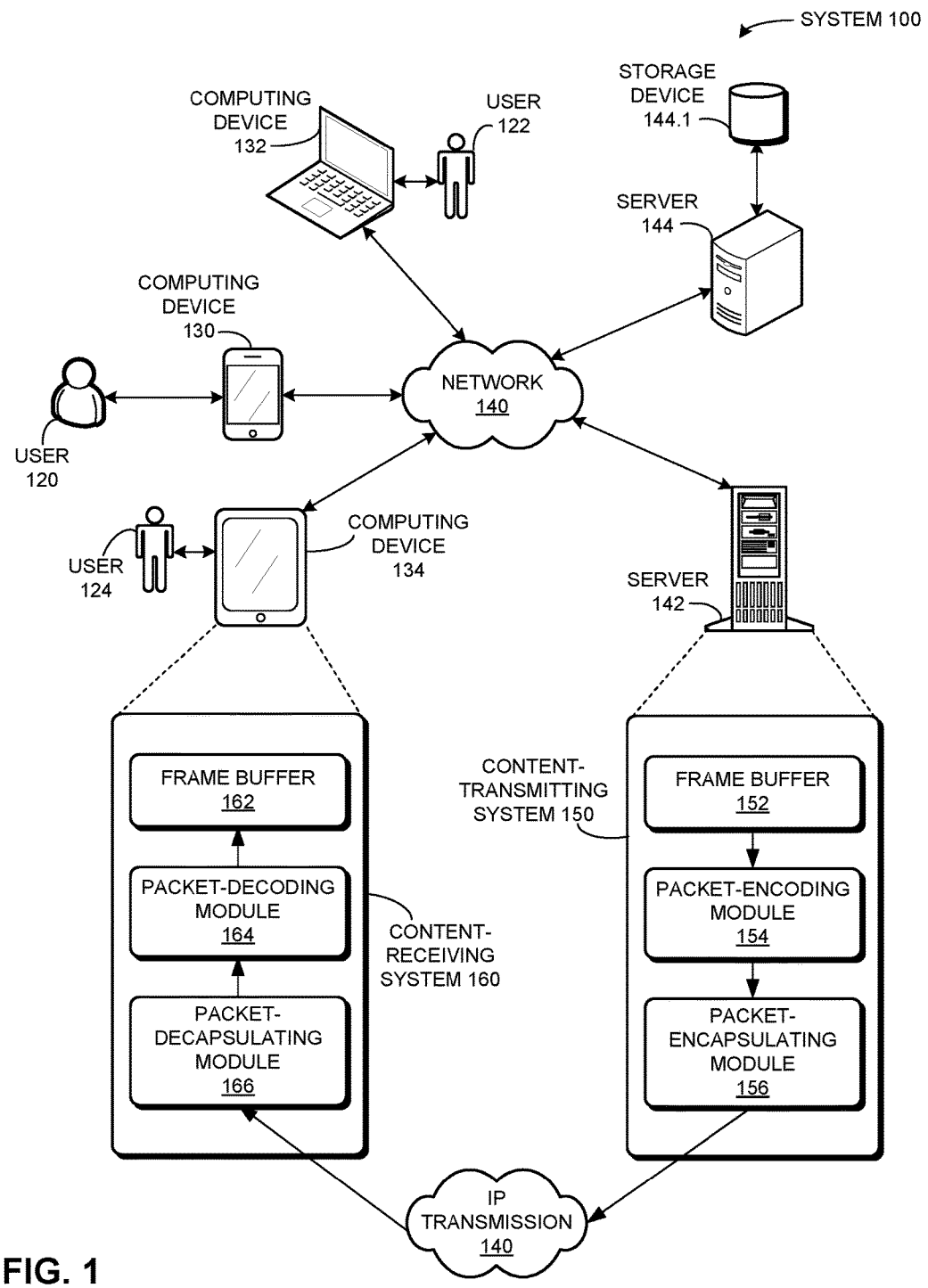
FIG. 1 illustrates an exemplary computing system that facilitates transmission of image frames of a video stream.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which securely and efficiently encrypts, transmits, and decrypts video data (e.g., image frames of a video stream) based on selective encryption of the image frames. In a current method of video data transfer, a transmitting device can perform data encapsulation in real time on image frames, and transmit the encapsulated image frames to a receiving device as a video stream. The receiving device can subsequently decapsulate the encapsulated image frames of the video stream to continuously display the video stream on a local display of the receiving device. In order to reduce the volume of the data transmission, the transmitting device may also encode the image frame before encapsulating and transmitting the image frame, and the receiving device may decapsulate and decode the image frame. Recall that the transmitting device and the receiving device can include a desktop computer, a mobile device such as a laptop or tablet, an embedded device, a smart television, or other computing device.

In a system based on, e.g., the Linux Framebuffer technology, two encryption methods may be used. In the first method, no encryption is used. The transmitting device obtains an image frame from a Framebuffer, performs video encoding and packet encapsulation, and transmits the image frame to the receiving device as an IP data packet, where no encryption process is performed. In the second method, encryption can occur at the transmission layer. The encapsulated image frame is encrypted and subsequently transmitted (e.g., based on an SSL protocol). However, in the first method (no encryption), if the transmitted data is intercepted by a malicious entity, the transmitted data may be easily obtained, which may result in a leak of private or confidential information. Furthermore, in the second method (encryption at the transmission layer), the transmitting device must encrypt each encapsulated and possibly encoded image frame, and the receiving device must decrypt each image frame. This may result in a decreased efficiency in the system.

Embodiments of the present invention solve these problems by allowing the transmitting device to selectively encrypt image frames if the image frames meet a predetermined condition for encryption, based on an encryption algorithm. The image frames may be dynamic image frames which are output in real-time by an application or a software tool with an image generation or processing function. A series of successive or continuous image frames can form a video stream, which is transmitted by a content-transmitting device via a network to a content-receiving device. The content-receiving device can successively or continuously play the image frames of the video stream, e.g., by displaying the image frames sequentially on a display device of the content-receiving device.

The predetermined encryption condition can be encrypting images frames which meet a certain sequence rule, such as encrypting only odd or even image frames. The predetermined encryption condition can also be based on specific predetermined requirements, e.g., associated with the type of image frame, an application corresponding to the content-transmitting device, or any other system requirement. The predetermined encryption condition can also be based on encrypting image frames whose pixel point values at predetermined positions are consistent with predetermined values.

To selectively encrypt an image frame, the transmitting device inserts corresponding encryption identification information while encapsulating the image frame (e.g., writes the encryption identification information into the encapsulation information for the image frame). Subsequently, the receiving device decrypts the encrypted image frame based on the corresponding encryption identification information. For example, the corresponding encryption identification information may indicate both that an image frame is encrypted and the encryption algorithm used, so that the receiving device can determine the corresponding decryption algorithm. Furthermore, the system can initially determine that an image frame is to be encrypted (e.g., if the image frame includes key information associated with a user, a user account, or a password). The system can write an encryption indicator into the frame image, such that the image frame itself can carry a self-described indicator of whether the frame is encrypted or not. The encryption indicator can also include other information that the system can subsequently use to determine whether or not a predetermined condition for encryption is met.

Thus, embodiments of the present invention solve the problem of the first current method (no encryption) by providing selective encryption. Furthermore, because the image frame itself can include the encryption indicator, the system may eliminate the need for an upper layer application to access a lower layer encryption module. Decoupling the upper layer application from the lower layer processing solves the problem of the second current method (transmission layer encryption) by reducing overhead and increasing the overall efficiency of the system.

Thus, the present system provides improvements to the distribution of digital content, where the improvements are fundamentally technological. Embodiments of the present invention provide a technological solution (e.g., providing selective encryption between encoding and encapsulation) to the technological problem of the efficient, secure, and effective distribution of digital content.

Exemplary Network in the Prior Art

FIG. 1 illustrates an exemplary computing system 100 that facilitates transmission of image frames of a video stream. System 100 can include computing devices 130, 132, and 134, which are associated with users 120, 122, and 124, respectively. Computing devices 130-134 can include, for example, a tablet, a mobile phone, an electronic reader, a laptop computer, a desktop computer, or any other computing device. Computing devices 130-134 can communicate with servers 142 and 144 via a network 140. Server 144 can communicate with a storage device 144.1. In some embodiments, storage device 144.1 resides on server 144. Servers 142 and 144 can also include any other computing device. Server 142 can be a content-transmitting device, and can include a content-transmitting system 150, whereby video data may be processed and transmitted to a content-receiving system 160 at computing device 134, which can be a content-receiving device. Content-transmitting system 150 can include: a frame buffer 152 which is a display buffer area in memory; a packet-encoding module 154; and a packet-encapsulating module 156.

In content-transmitting system 150, an image frame may be obtained from frame buffer 152, encoded by packet-encoding module 154, encapsulated by packet-encapsulating module 156, and subsequently transmitted over network 140 based on an IP transmission. Content-receiving system 160 can receive the encapsulated and encoded image frame. Packet-decapsulating module 166 can decapsulate the incoming encapsulated and encoded image frame. Packet-decoding module 164 can decode the decapsulated and encoded image frame. Frame buffer 164 can subsequently output the image frame for display (e.g., on the display of computing device 134 for viewing by user 124). In this prior art network 100, no encryption is depicted.

Exemplary Network and Environment

Figure 2:
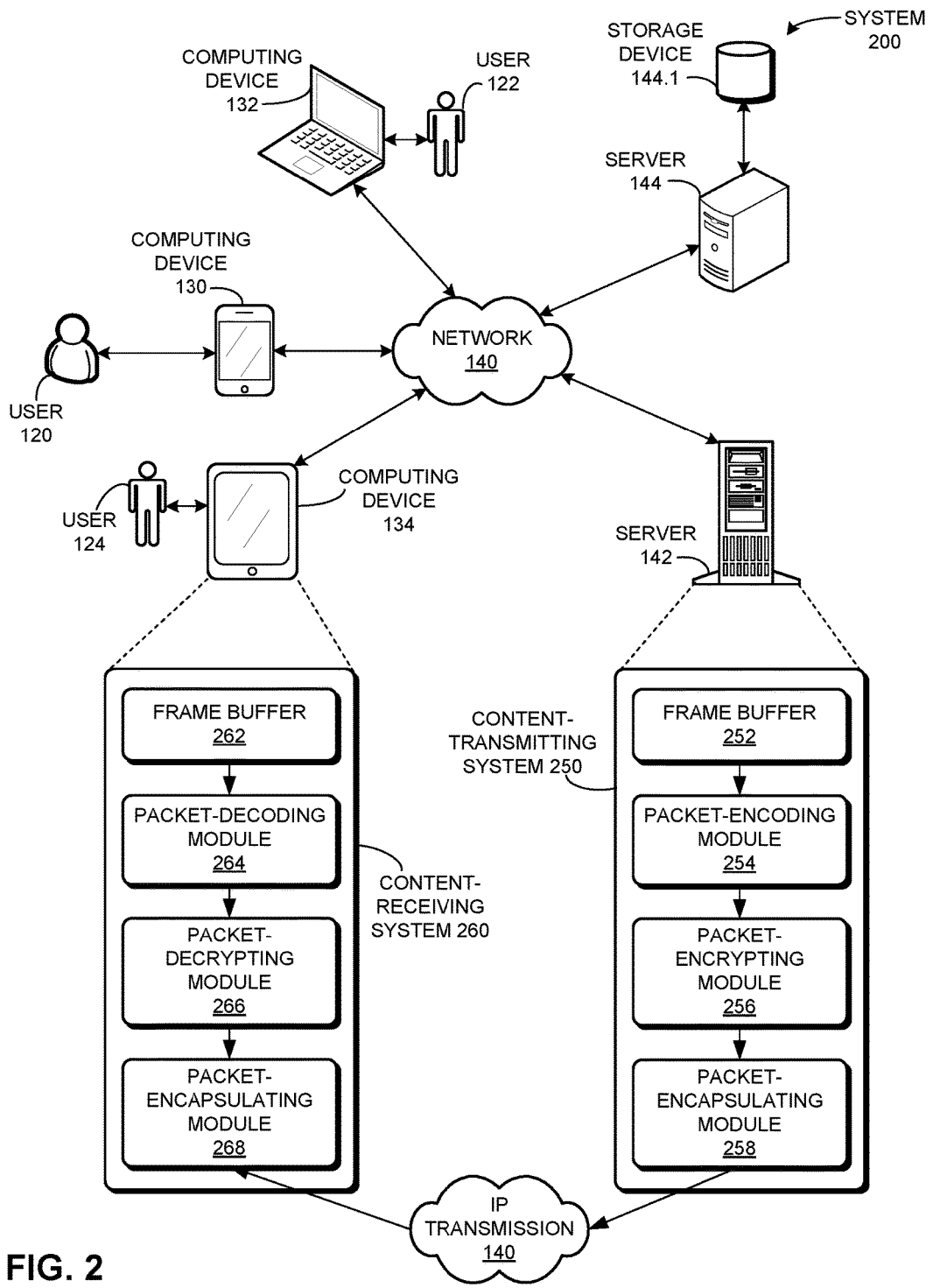
FIG. 2 illustrates an exemplary computing system that facilitates efficient and secure encryption, transmission, and decryption of image frames based on selective encryption, in accordance with an embodiment of the present application.

FIG. 2 illustrates an exemplary computing system 200 that facilitates efficient and secure encryption, transmission, and decryption of image frames based on selective encryption, in accordance with an embodiment of the present application. System 200 includes the same entities as system 100, but content-transmitting device 142 includes a content-transmitting system 250, and content-receiving device 134 includes a content-receiving system 260. During operation, an image frame may be obtained from frame buffer 252 and encoded by packet-encoding module 254. The system can determine whether the image frame meets a predetermined condition for encryption, and if so, packet-encrypting module 256 can encrypt the image frame. Subsequently, the encrypted image frame can be encapsulated by packet-encapsulating module 258, and transmitted over network 140 based on an IP transmission. Content-receiving system 260 can receive the encapsulated, encrypted, and encoded image frame. Packet-decapsulating module 268 can decapsulate the incoming encapsulated, encrypted, and encoded image frame. Packet-decrypting module 266 can decrypt the encrypted and encoded image frame, based on encryption identification information included as encapsulation information for the image frame. Packet-decoding module 264 can decode the decapsulated, decrypted, and encoded image frame. Frame buffer 262 can subsequently output the image frame for display (e.g., on the display of computing device 134 for viewing by user 124).

Generating an Image Frame and Inserting an Encryption Indicator into the Image Frame A content-transmitting device may generate an image frame. The image frame may be generated by an application with an image generation or processing function, or output by a software tool. The image frame may also be obtained from a file system or a memory storage or area. The image frame may be a graphical user interface drawn by an application running on the content-transmitting device. For example, the application may write an image frame into a display buffer which corresponds to a display device by invoking an interface provided by the system, and the image frame written into the display buffer may be displayed on the display device. The displayed image frame may be referred to as a "desk image frame" or a "picture frame." The image frame may be of different formats. If the content-transmitting device is a desktop computer or a tablet computer, the image frame may be in an RGB format. If the content-transmitting device is a smart television, the image frame may be in a YUV format.

If the image frame includes sensitive information, such as key information like an account and a password, or a process of inputting the key information, the system may determine to encrypt the image frame to prevent the sensitive information from being exposed to potential leakage during transmission over the network to the content-receiving device. In drawing an image frame which includes key information, the application can draw a graphical user interface which includes user account information. The application can also draw a graphical user interface which includes a process of inputting the account information. As described above, the system can include an encryption indicator in the image frame itself. This eliminates the coupling between an application layer and a bottom layer function module, and allows the application to flexibly select which image frames are to be encrypted (e.g., an image frame that includes sensitive information).

The system may encrypt an image frame by inserting the encryption indicator based on different predetermined conditions. For example, the application can set, for an image frame, a pixel point value at a predetermined position. Subsequently, when the system makes the encryption decision for the image frame, the system can determine that the image frame has a pixel point with a set value at a predetermined position of the image frame, wherein the set value matches a predetermined value for the predetermined position. The system can thus encrypt the image frame. For example, the predetermined position may be 4 vertexes of the image frame, and, for an RGB image frame in which each pixel point is presented by using a 16-bit binary value, the predetermined value may be 0xFFFF. The system can also determine whether to encrypt an image frame by executing a specific calculation on a pixel point value at a predetermined position of the image frame, and determining whether the result of the calculation is within a predetermined range.

In some embodiments, the system may implement this method (e.g., obtain the image frame) based on an interface or operation manner provided by a system platform implementing this method. For example, the system can be a content-transmitting device or terminal which adopts the Linux system and accesses the Framebuffer. The Framebuffer (or "frame buffer") is a display buffer area in a memory, and an image frame written into the frame buffer may be displayed on a local display device. An application can thus display an image frame by writing into the frame buffer. For an image frame that is to be encrypted, the system can also write the encryption indicator into the image frame by writing into the frame buffer. The application may directly access the frame buffer or access the frame buffer through an interface provided by the system platform implementing this method.

Additionally, an application drawing the image frame can write the encryption indicator into the image frame in advance, e.g., by setting the pixel point value of the image frame at the predetermined position to the predetermined value. In some embodiments, a service program can be used to uniformly process the encryption indicator. For example, the service program may determine, based on mode recognition, whether the image frame includes information that needs to be protected, and, if so, the system can write the encryption indicator into the image frame.

Figure 3A:
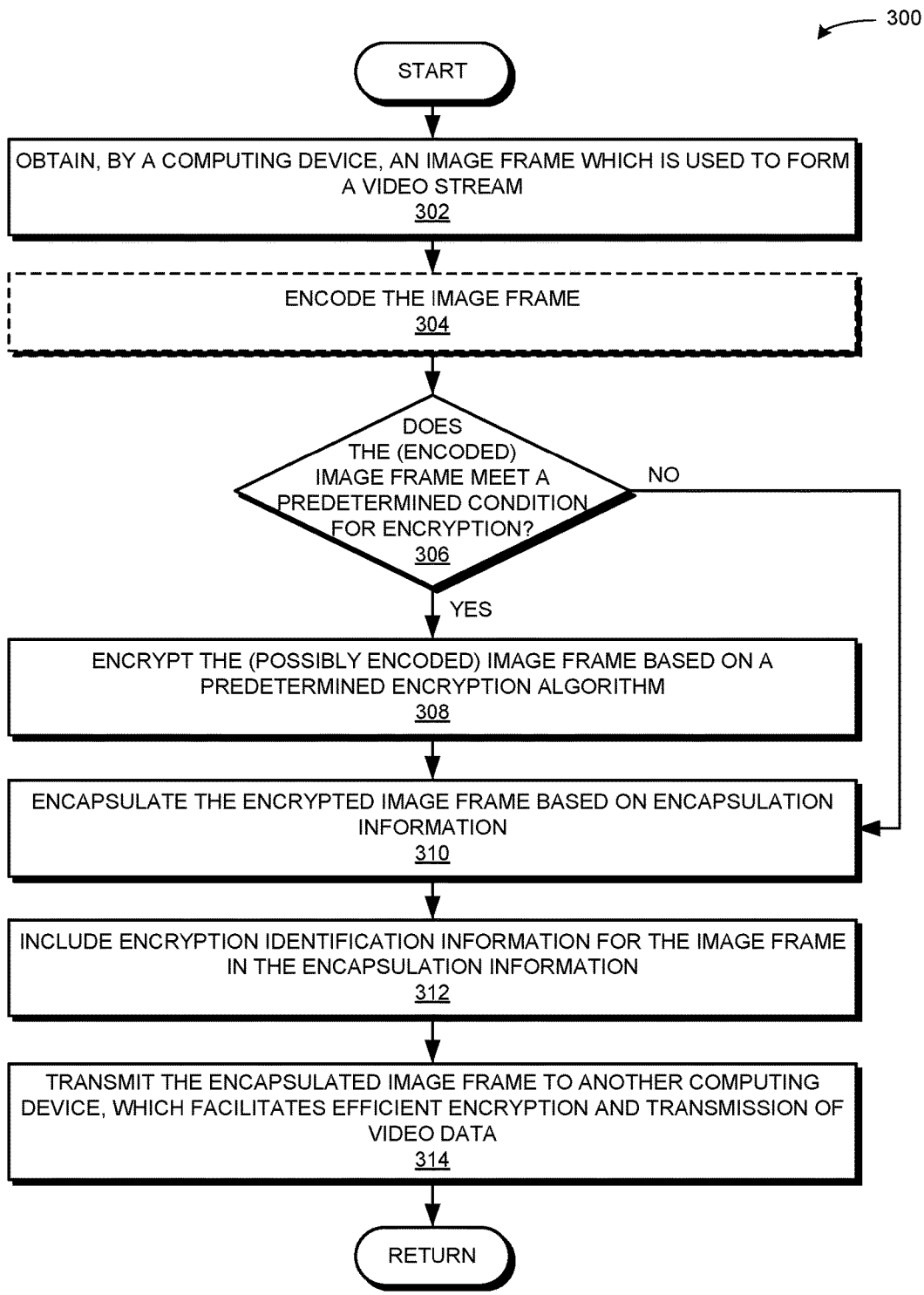
FIG. 3A presents a flowchart illustrating a method by a content-transmitting device for facilitating efficient and secure encryption and transmission of image frames based on selective encryption, in accordance with an embodiment of the present application.

Content-Transmitting Device Facilitates Efficient Encryption and Transmission of Video Data FIG. 3A presents a flowchart 300 illustrating a method by a content-transmitting device for facilitating efficient and secure encryption and transmission of image frames based on selective encryption, in accordance with an embodiment of the present application. During operation, the system obtains, by a computing device which is a content-transmitting device, an image frame which is used to form a video stream (operation 302). Obtaining the image frame and writing an encryption indicator into the image frame are described above. The system may obtain the image frame by acquiring a screen shot, or by accessing a display buffer corresponding to the display device (such as reading the image from the frame buffer).

Next, the system can optionally encode the image frame (operation 304). The system can determine whether it needs to encode the image frame. For example, because a large image frame may consume a higher amount of network bandwidth and may also result in a more time-consuming transmission, the system may determine to encode the large image frame. In contrast, the system may determine not to encode an image frame that is small or that does not exceed a transmission requirement of network bandwidth. Video encoding may be performed by using the H.264 standard, which can eliminate redundant information existing in the image frame. Other compression and encoding techniques may also be used, such as H.263 or MPEG4. The operation of encoding the image frame may also occur after the system determines that the image frame is to be encrypted (e.g., after decision 306, below).

The system then determines whether the (possibly encoded) image frame meets a predetermined condition for encryption (decision 306). Because the image frame includes the encryption indicator, the corresponding information may be extracted from the image frame. The system can thus determine whether the corresponding information meets a predetermined encryption condition. For example, the predetermined encryption condition may be a rule to encrypt an image which meets a certain sequence rule, e.g., if the image is an odd or an even frame. The predetermined condition may also be found in the encryption indicator of the image frame itself. The encryption indicator can be a certain pixel point at a certain position that is set at a certain value. For example, if the predetermined encryption condition is that the pixel point of the image frame at a predetermined position is a predetermined value, then the system reads, from the image frame (i.e., based on the encryption indicator of the image frame), the value of the pixel point at the predetermined position. The system compares the read value with the corresponding predetermined value for that predetermined position. If the read value matches the predetermined value, the system determines that encryption is needed. If the read value does not match the predetermined value, the system determines that encryption is not needed.

Thus, if the image frame meets a predetermined encryption condition (decision 306), the system encrypts the (possibly encoded) image frame based on an encryption algorithm (operation 308). The encryption algorithm can include: a Data Encryption Standard (DES) algorithm; a Triple DES (3DES) algorithm; an RC2 algorithm; an RC4 algorithm; an International Data Encryption Algorithm (IDEA) algorithm; and an Advanced Encryption Standard (AES) algorithm. Other encryption algorithms may also be adopted, as long as the content-receiving device can perform decryption by using a corresponding decryption algorithm after receiving the image frame. If the image frame does not meet a predetermined encryption condition (decision 306), the operation continues as described below for operation 310.

Subsequently, the system encapsulates the encrypted image frame based on encapsulation information (operation 310). The encapsulated image frame can include the encapsulation information. The system includes the corresponding encryption identification for the image frame in the encapsulation information (operation 312). The encryption identification information can indicate whether the image frame is encrypted (as from operation 308) or not encrypted (as from operation 306). The encryption identification information can also include the encryption algorithm used by the content-transmitting device to encrypt the image frame, which allows the content-receiving device to determine the corresponding decryption algorithm.

The process of encapsulating the image frame generally refers to performing hierarchical encapsulation on the image frame based on requirements of network transmission. For example, the system may encapsulate the image frame as a TCP or UDP message, and then perform encapsulation of an IP data packet. In embodiments of the present invention, a Real-time Transport Protocol (RTP) of a transmission layer can provide a peer-to-peer transmission service with a real-time feature. The system can use an RTP extension header, and encapsulate the image frame based on the RTP. That is, the system can write the corresponding encryption identification information into the extension header of the RTP header (as described below in relation to FIG. 5), and encapsulate the image frame into an IP data packet. Finally, the system transmits the encapsulated image frame to another computing device (i.e., the content-receiving device), which facilitates efficient encryption and transmission of video data (operation 314).

Figure 3B:
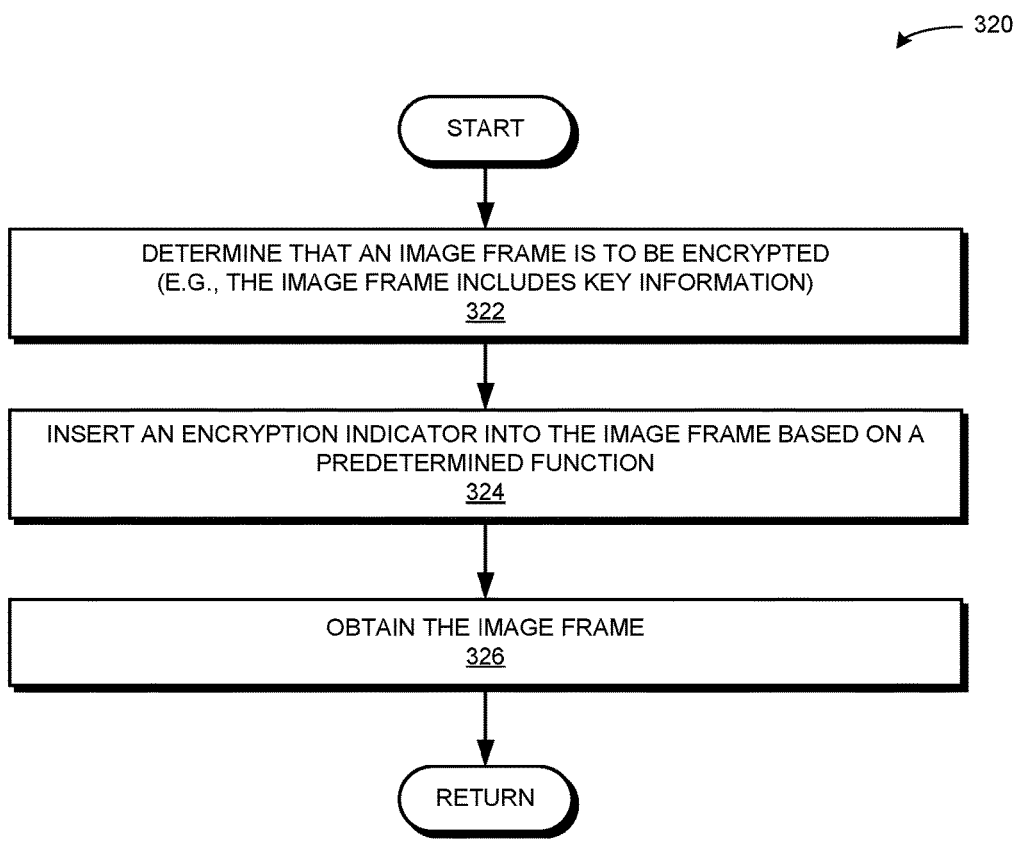
FIG. 3B presents a flowchart illustrating a method by a content-transmitting device for facilitating efficient and secure encryption and transmission of image frames based on selective encryption, in accordance with an embodiment of the present application.

In addition, before obtaining the image frame (as in operation 302 of FIG. 3A), the system can determine that an image frame is to be encrypted, and the system can insert an encryption indicator into the image frame based on a predetermined function. FIG. 3B presents a flowchart 320 illustrating a method by a content-transmitting device for facilitating efficient and secure encryption and transmission of image frames based on selective encryption, in accordance with an embodiment of the present application. During operation, the system determines that an image frame is to be encrypted (operation 322) (e.g., the image frame is an odd frame, or the image frame includes key information, or some other condition). The system inserts an encryption indicator into the image frame based on a predetermined function (operation 324). For example, the system can set the value of a pixel point at a predetermined position to a certain predetermined value. Subsequently, the system can obtain the image frame (operation 326), and the operation continues as described above in relation to FIG. 3A.

Exemplary Format of RTP Header and RTP Extension Header

FIG. 4 presents an exemplary format of an RTP header 400, in accordance with an embodiment of the present application. Header 400 can include: a V (Version) 402 field (2 bits), which indicates that the version of the protocol is "2"; a P (Padding) 404 field (1 bit), which indicates whether there are extra padding bytes at the end of the RTP packet; an X (Extension) 406 field (1 bit) which indicates the presence of an extension header between the standard header and the payload data; a CC (CSRC count) 408 field (4 bits), which contains the number of CSRC identifiers that follow the fixed header; an M (Marker) 410 field (1 bit), which is used at the application level and defined by a profile; a PT (Payload Type) 412 field (7 bits), which indicates the format of the payload and determines its interpretation by the application; a Sequence Number 414 field (16 bits), which is incremented by one for each RTP data packet sent and is to be used by the receiver to detect packet loss and to restore packet sequence; a Timestamp 416 field (32 bits), which is used to enable the receiver to play back the received samples at appropriate intervals; an SSRC identifier 418 field (32 bits), which is a synchronization source identifier that uniquely identifies the source of a stream; and CSRC identifiers 420 field (32 bits each), in which contributing source IDs enumerate contributing sources to a stream which has been generated from multiple sources.

The bit or field X 406 is an extended flag. When X is set to 1, this indicates that an extension header follows the RTP header. In embodiments of the present invention, this also means that the corresponding encryption identification information is included in the extension header. The encryption identification information includes at least: information identifying whether the image frame is encrypted; and, for an encrypted image frame, the predetermined encryption algorithm used to encrypt the image frame.

FIG. 5 presents an exemplary format of an RTP extension header 500, in accordance with an embodiment of the present application. Extension header 500 can include: a Profile-Specific Extension Header (EH) Identifier 502 field (16 bits); an Extension Header Length 504 field (16 bits) which indicates the length of the extension header in 32-bit units, excluding the 32 bits of the extension header itself; and an Extension Header (EH) 506 field. In embodiments of the present invention, the encryption identification information is written into EH 506. A value of the EH length field 504 is set to "4," indicating that EH 506 occupies 4 bytes. A bit[0] of a byte 0 in EH 506 is an encryption bit. The bit[0] is set to "1" for an encrypted image frame, and the bit[0] is set to "0" for a non-encrypted image frame. Bit[4] to bit[7] of the byte 0 are an encryption type, indicating the adopted encryption algorithm. Other bits are reserved. The values of bit[4] to bit [7] may be set in the following manner: 1—DES algorithm; 2—3DES algorithm; 3—RC2 algorithm; 4—RC4 algorithm; 5—IDEA algorithm; and 6—AES algorithm.

Writing the encryption identification information in the RTP extension header notifies the content-receiving device of whether the encapsulated image frame is encrypted, and also of the adopted encryption algorithm. This allows the content-receiving device to execute the correct decryption operation. In some embodiments, the content-transmitting device and the content-receiving device may negotiate in advance to use a fixed encryption algorithm. In this case, only a corresponding encryption bit needs to be set in the RTP extension header.

The above description provides a specific manner of carrying the encryption identification information by using the RTP extension header. The encryption identification information may be carried in the RTP extension header by using different bits or different values. Furthermore, encapsulation may be performed by using other protocols other than the RTP. Embodiments of the present invention write the encryption identification information into the encapsulation information, which allows the content-receiving device to execute a corresponding decapsulation operation and extract the encryption identification information from the encapsulation information.

Content-Receiving Device Facilitates Efficient Decryption of Video Data

Figure 6:
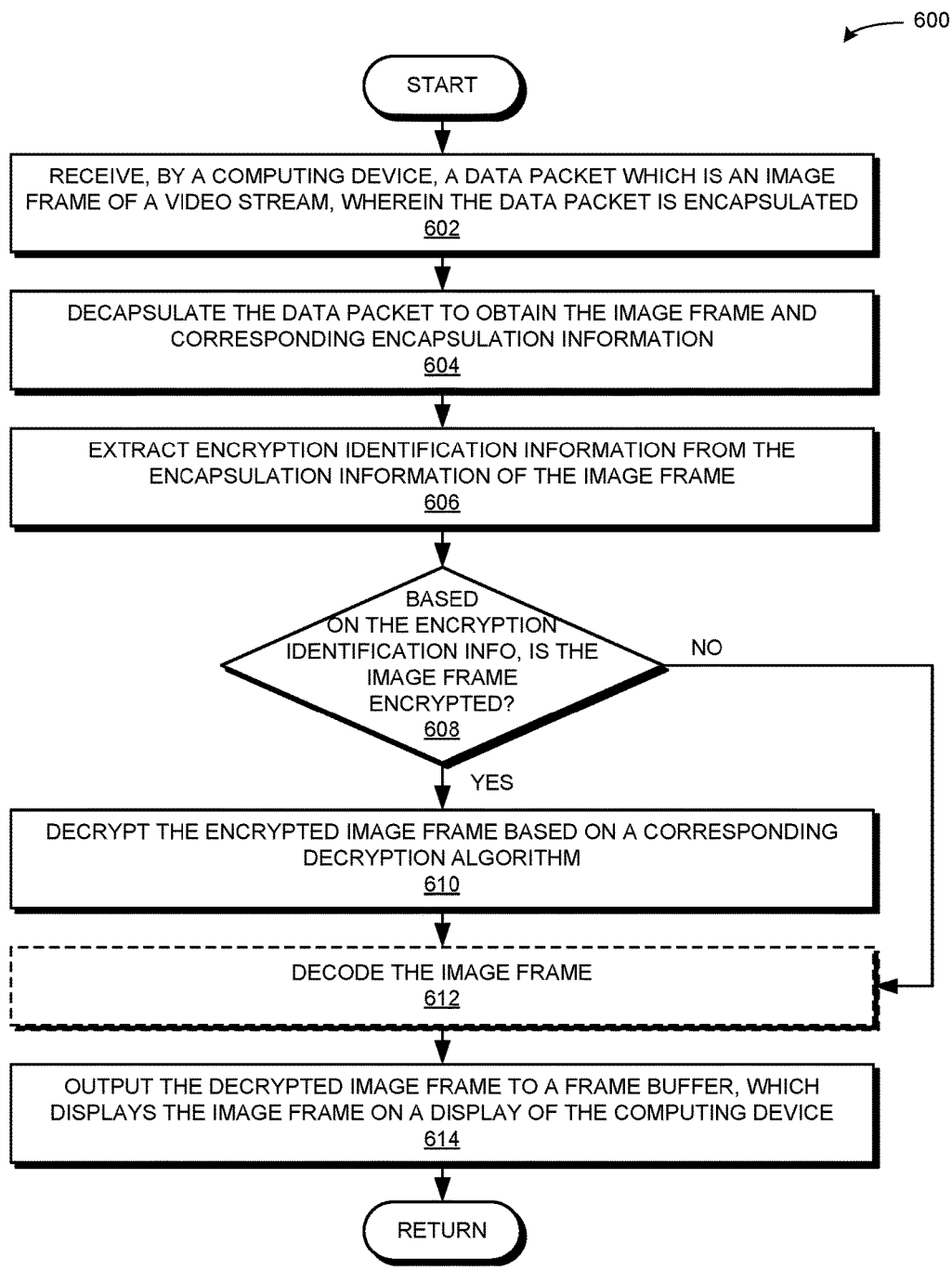
FIG. 6 presents a flowchart illustrating a method by a content-receiving device for facilitating efficient and secure decryption of image frames based on selective encryption, in accordance with an embodiment of the present application.

FIG. 6 presents a flowchart 600 illustrating a method by a content-receiving device for facilitating efficient and secure decryption of image frames based on selective encryption, in accordance with an embodiment of the present application. During operation, the system receives, by a computing device that is a content-receiving device, a data packet which is an image frame of a video stream, wherein the data packet is encapsulated (operation 602). The system decapsulates the data packet to obtain the image frame and corresponding encapsulation information (operation 604). The system extracts encryption identification information from the encapsulation information of the image frame (operation 606). For example, when the encryption identification information is carried in the RTP extension header, the system can read the encryption identification information from the RTP extension header.

The system determines, based on the encryption identification information, whether the image frame is encrypted (decision 608). As described above in relation to FIG. 4, the encryption identification information includes at least: information identifying whether the image frame is encrypted; and, for an encrypted image frame, the predetermined encryption algorithm used to encrypt the image frame. If the image frame is encrypted, the system decrypts the encrypted image frame based on a corresponding decryption algorithm (operation 610). The system can determine the corresponding decryption algorithm based on the encryption identification information, which indicates the encryption algorithm used to encrypt the image frame. Furthermore, as described above in relation to FIG. 5, the content-transmitting device and the content-receiving device may negotiate in advance to use a fixed encryption algorithm. In this case, only a corresponding encryption bit is set in the RTP extension header, which allows the content-receiving device to determine the corresponding decryption algorithm. If the image frame is not encrypted, the operation continues as described below for operation 612.

Next, if the image frame is encoded, the system can decode the image frame (operation 612). The system can use a decoding method which corresponds to the encoding method used by the content-transmitting device. The system can output the (possibly decoded) and decrypted image frame to a frame buffer, which displays the image frame on a display of the computing device (i.e., the content-receiving device) (operation 614). The obtained image frame is the original desk image frame from the content-sending device. For a system which supports the Framebuffer technology, the obtained image frame may be written into the Framebuffer, which allows the content-receiving device to locally display the obtained frame image (e.g., the original desk image frame from the content-sending device).

Thus, embodiments of the present invention allow the content-receiving system to decrypt the selectively encrypted image frames of a video stream, i.e., to only decrypt the image frames indicated as encrypted based on the encryption identification information carried in the encapsulation information of an encapsulated data packet or image frame. The selective encryption of the image frames by the content-sending device thus results in fewer decryption operations by the content-receiving device. Thus, the system provides an efficient and secure method for encryption, transmission, and decryption of video data by selectively encrypting image frames, which reduces the overhead in both network communication and processing for the individual devices.

Exemplary System with Apparatuses

Figure 7:
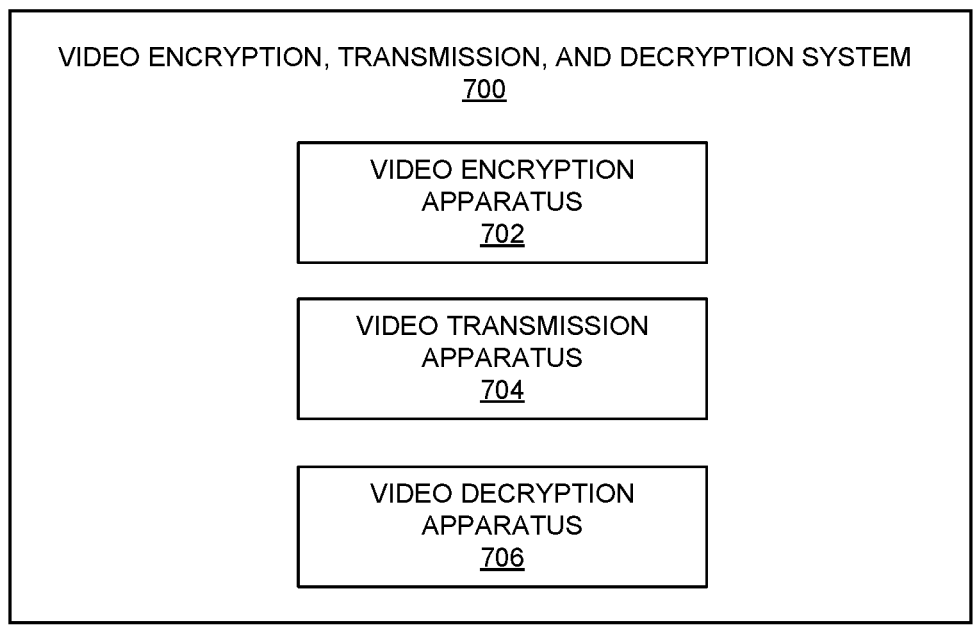
FIG. 7 illustrates an exemplary video encryption, transmission, and decryption system that facilitates efficient and secure transmission of image frames based on selective encryption, in accordance with an embodiment of the present application.

FIG. 7 illustrates an exemplary video encryption, transmission, and decryption system 700 that facilitates efficient and secure transmission of image frames based on selective encryption, in accordance with an embodiment of the present application. System 700 can comprise a plurality of apparatuses which may communicate with one another via a wired or wireless communication channel. System 700 may be realized using one or more integrated circuits, and may include fewer or more apparatuses than those shown in FIG. 7. Further, apparatus 700 may be integrated in a computer system, or realized as a separate device which is capable of communicating with other computer systems and/or devices. Specifically, apparatus 700 can comprise a video encryption apparatus 702, a video transmission apparatus 704, and a video decryption apparatus 706. Video encryption apparatus 702 can perform the methods described above in relation to FIGS. 3A and 3B. Video transmission apparatus 704 can perform the methods described above for transmitting or communicating an image frame from one computing device (e.g., a content-transmitting device such as device 142 in FIG. 2) to another computing device (e.g., a content-receiving device such as device 134 in FIG. 2). Video decryption apparatus 706 can perform the methods described above in relation to FIG. 6.

Exemplary Computer System for Encrypting and Transmitting Video Data

Figure 8:
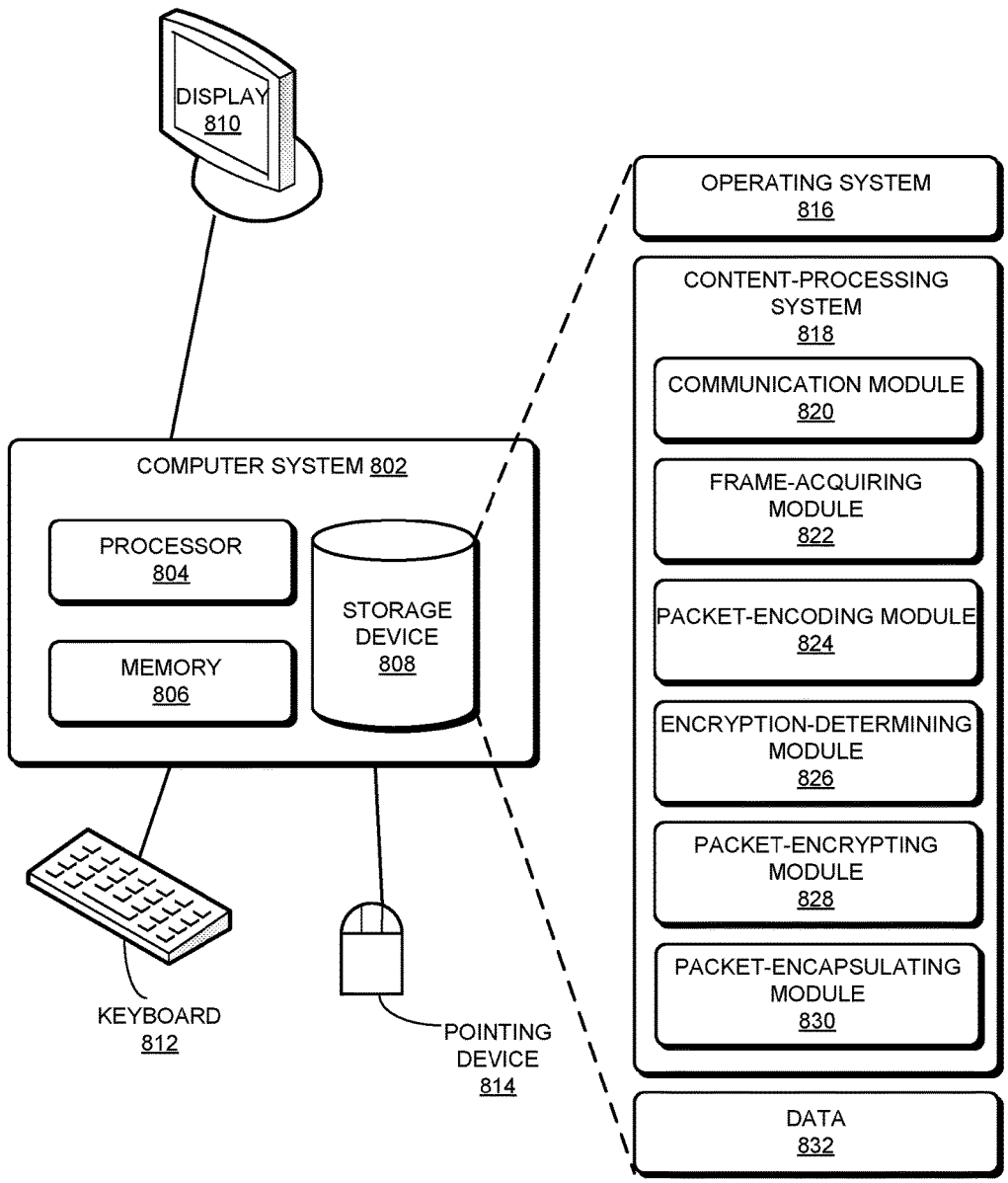
FIG. 8 illustrates an exemplary computer system that facilitates efficient and secure encryption and transmission of image frames based on selective encryption, in accordance with an embodiment of the present application.

FIG. 8 illustrates an exemplary computer system that facilitates efficient and secure encryption and transmission of image frames based on selective encryption, in accordance with an embodiment of the present application. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store an operating system 816, a content-processing system 818, and data 832.

Content-processing system 818 can include instructions, which when executed by computer system 802, can cause computer system 802 to perform methods and/or processes described in this disclosure. Specifically, content-processing system 818 may include instructions for sending and/or receiving data packets to/from other network nodes across a computer network, including network which supports IP communications. Content-processing system 818 can also include instructions for obtaining an image frame which is used to form a video stream (frame-acquiring module 822). Content-processing system 818 can include instructions for, in response to determining that the image frame satisfies a predetermined condition for encryption (encryption-determining module 826), encrypting the image frame based on an encryption algorithm (packet-encrypting module 828). Content-processing system 818 can further include instructions for encapsulating the encrypted image frame based on encapsulation information (packet-encapsulating module 830), and including encryption identification information for the image frame in the encapsulation information (packet-encapsulating module 830).

Content-processing system 818 can additionally include instructions for, in response to obtaining the image frame (frame-acquiring module 822), encoding the image frame (packet-encoding module 824). Content-processing system 818 can include instructions for transmitting the encapsulated image frame to a content-receiving device (communication module 820).

Content-processing system 818 can also include instructions for encapsulating the encrypted image frame based on a Real-time Transport Protocol (RTP), and including in a corresponding RTP extension header for the encrypted image frame the encryption identification information for the image frame by setting extension bits of the corresponding RTP extension header (packet-encapsulating module 830). Content-processing system 818 can include instructions for inserting an encryption indicator into the image frame based on a predetermined function (packet-encrypting module 828), and determining that the image frame satisfies the predetermined condition for encryption based on the encryption indicator (encryption-determining module 826).

Figure 9:
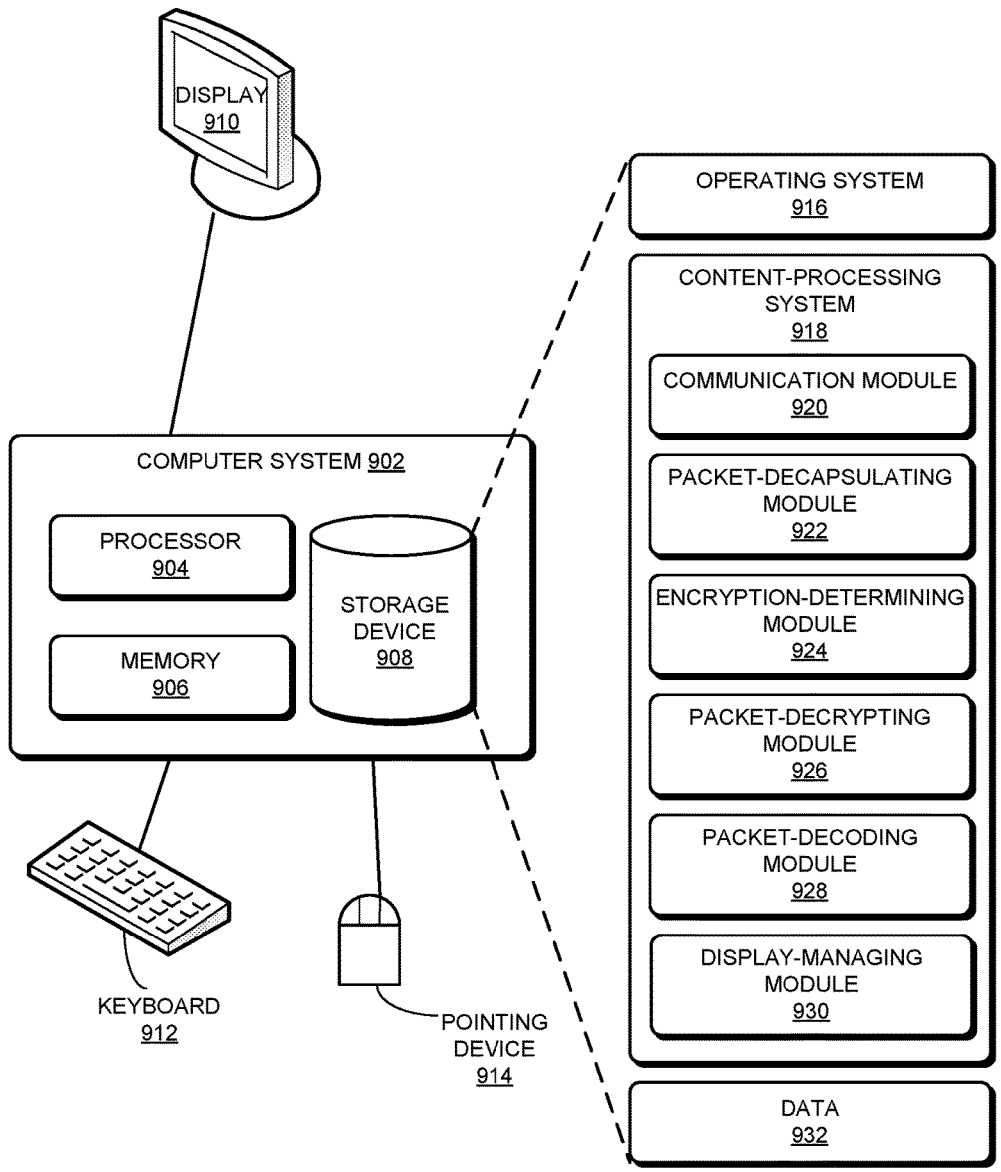
FIG. 9 illustrates an exemplary computer system that facilitates efficient and secure decryption of image frames based on selective encryption, in accordance with an embodiment of the present application.

FIG. 9 illustrates an exemplary computer system that facilitates efficient and secure decryption of image frames based on selective encryption, in accordance with an embodiment of the present application. Computer system 902 includes a processor 904, a memory 906, and a storage device 908. Memory 906 can include a volatile memory (e.g., RAM) that serves as a managed memory, and can be used to store one or more memory pools. Furthermore, computer system 902 can be coupled to a display device 910, a keyboard 912, and a pointing device 914. Storage device 908 can store an operating system 916, a content-processing system 918, and data 932.

Content-processing system 918 can include instructions, which when executed by computer system 902, can cause computer system 902 to perform methods and/or processes described in this disclosure. Specifically, content-processing system 918 may include instructions for sending and/or receiving data packets to/from other network nodes across a computer network, including network which supports IP communications. Content-processing system 918 can include instructions for receiving, by a content-receiving device, a data packet which is an image frame of a video stream, wherein the data packet is encapsulated (communication module 920). Content-processing system 918 can also include instructions for decapsulating the encapsulated data packet to obtain the image frame and corresponding encapsulation information (packet-decapsulating module 922). Content-processing system 918 can further include instructions for extracting encryption identification information from the encapsulation information of the image frame (packet-decapsulating module 922). Content-processing system 918 can include instructions for, in response to determining, based on the encryption identification information, that the image frame is encrypted (encryption-determining module 924), decrypting the encrypted image frame based on a decryption algorithm (packet-decrypting module 926). Content-processing system 918 can include instructions for outputting the decrypted image frame to a frame buffer, which displays the image frame on a display of the computer system (display-managing module 930).

Content-processing system 918 can additionally include instructions for, in response to determining that the decapsulated image frame is encoded, decoding the encoded image frame to obtain the image frame and the corresponding encapsulation information (packet-decoding module 928).

Data 832 and data 932 can include any data that is required as input or that is generated as output by the methods and/or processes described in this disclosure. Specifically, data 832 or data 932 can store at least: a data packet; an image frame; a video stream comprised of image frames; an encoding function; a decoding function; an encryption function, based on an encryption algorithm; a decryption function corresponding to the encryption function; a predetermined condition for encryption; an encryption algorithm; a decryption algorithm; an RTP header; an RTP extension header; encryption identification information; an indication of whether an image frame is encrypted; an encryption indicator; an encapsulation function; a decapsulation function; an encoded image frame; an encrypted image frame; an encapsulated image frame; an image frame which includes an encryption indicator; a DES algorithm; a 3DES algorithm; an RC2 algorithm; a RC4 algorithm; an IDEA algorithm; an AES algorithm; and a value for a pixel point at a certain position.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for selective encryption, the system comprising:
  a processor; and
  a memory coupled to the processor and storing instructions, which when executed by the processor cause the processor to perform a method, the method comprising:
    determining, based on a predetermined condition, that an image frame output by an application is to be encrypted;
    inserting an encryption indicator into the image frame based on the predetermined condition, wherein the encryption indicator is a self-described indicator of whether the image frame is to be encrypted;
    obtaining the image frame, which is used to form a video stream;
    in response to determining that the encryption indicator indicates that the image frame is to be encrypted, encrypting the image frame based on an encryption algorithm;
    encapsulating the encrypted image frame based on encapsulation information;
    including encryption identification information for the image frame in the encapsulation information;
    decoupling the application associated with an upper layer from a processing performed by a lower layer; and
    displaying, by the computer system on a display device of the computer system, the video stream sequentially and continuously, wherein the video stream includes selectively encrypted image frames.

2. The computer system of claim 1, wherein the method further comprises:
  in response to obtaining the image frame, encoding the image frame, wherein determining that the image frame satisfies the predetermined condition for encryption involves determining that the encoded image frame satisfies the predetermined condition for encryption, and wherein encrypting the image frame involves encrypting the encoded image frame.

3. The computer system of claim 1, wherein the method further comprises:

transmitting the encapsulated image frame to a content-receiving device, which causes the content-receiving device to:

receive the encapsulated image frame;

decapsulate the encapsulated image frame to obtain encryption identification information; and in response to determining, based on the encryption identification information, that the image frame is encrypted, decrypt the encrypted image frame based on a decryption algorithm, wherein the encryption identification information indicates the encryption algorithm used by the content-transmitting device to encrypt the image frame, and wherein the decryption algorithm corresponds to the indicated encryption algorithm.

4. The computer system of claim 1, wherein encapsulating the encrypted image frame is based on a Real-time Transport Protocol (RTP), and wherein the method further comprises:

including in a corresponding RTP extension header for the encrypted image frame the encryption identification information for the image frame by setting extension bits of the corresponding RTP extension header.

5. The computer system of claim 1, wherein the encryption identification information indicates one or more of:

whether the image frame is encrypted; and the predetermined encryption algorithm used by the content-transmitting device to encrypt the image frame.

6. The computer system of claim 1, wherein inserting the encryption indicator into the image frame based on the predetermined condition involves setting a pixel point value at a predetermined position of the image frame, and wherein the predetermined condition is based on whether the pixel point value at the predetermined position of the image frame is consistent with a predetermined value.

7. The computer system of claim 1, wherein the encryption algorithm is one or more of:

a Data Encryption Standard (DES) algorithm;

a Triple Data Encryption Standard (3DES) algorithm;

a Rivest Cipher 2 (RC2) algorithm;

a Rivest Cipher 4 (RC4) algorithm;

an International Data Encryption Algorithm (IDEA) algorithm; and an Advanced Encryption Standard (AES) algorithm.

8. The computer system of claim 1, wherein the method further comprises:

receiving a data packet which is an image frame of a video stream, wherein the data packet is encapsulated;

decapsulating the encapsulated data packet to obtain the image frame and corresponding encapsulation information;

extracting encryption identification information from the encapsulation information of the image frame;

in response to determining, based on the encryption identification information, that the image frame is encrypted, decrypting the encrypted image frame based on a decryption algorithm; and outputting the decrypted image frame to a frame buffer, which displays the image frame on a display of the computer system.

9. The computer system of claim 8, wherein the method further comprises:

in response to determining that the decapsulated image frame is encoded, decoding the encoded image frame to obtain the image frame and the corresponding encapsulation information, wherein extracting the encryption identification information further involves extracting the encryption identification information from the encapsulation information of the decoded image frame.

10. The computer system of claim 8, wherein the encryption identification information indicates an encryption algorithm used by a content-transmitting device to encrypt the image frame, and wherein the decryption algorithm corresponds to the indicated encryption algorithm.

11. The computer system of claim 1, wherein the encapsulated image frame is encapsulated based on a Real-time Transfer Protocol (RTP), and wherein a corresponding RTP extension header for the encrypted image frame includes the encryption identification information for the image frame based on extension bits of the corresponding RTP extension header.

12. The computer system of claim 8, wherein extracting the encryption identification information is based on a predetermined function.

13. The computer system of claim 1, wherein the predetermined condition is based on one or more of:

whether the image frame includes sensitive information, which includes one or more of account information and a password;

whether the image frame involves a process of inputting the sensitive information;

a sequence or order of the image frame within the video stream;

a type of the image frame;

an application corresponding to the computer system; and a system requirement.

14. A computer-implemented method for selective encryption, the method comprising:

determining, by a content-transmitting device based on a predetermined condition, that an image frame output by an application is to be encrypted;

inserting an encryption indicator into the image frame based on the predetermined condition, wherein the encryption indicator is a self-described indicator of whether the image frame is to be encrypted;

obtaining the image frame, which is used to form a video stream;

in response to determining that the encryption indicator indicates that the image frame is to be encrypted, encrypting the image frame based on an encryption algorithm;

encapsulating the encrypted image frame based on encapsulation information;

including encryption identification information for the image frame in the encapsulation information;

decoupling the application associated with an upper layer from a processing performed by a lower layer; and displaying, on a display device, the video stream sequentially and continuously, wherein the video stream includes selectively encrypted image frames.

15. The method of claim 14, further comprising:

in response to obtaining the image frame, encoding the image frame, wherein determining that the image frame satisfies the predetermined condition for encryption involves determining that the encoded image frame satisfies the predetermined condition for encryption, and wherein encrypting the image frame involves encrypting the encoded image frame.

16. The method of claim 14, further comprising:

transmitting the encapsulated image frame to a content-receiving device, which causes the content-receiving device to:

receive the encapsulated image frame;

decapsulate the encapsulated image frame to obtain encryption identification information; and in response to determining, based on the encryption identification information, that the image frame is encrypted, decrypting the encrypted image frame based on a decryption algorithm, wherein the encryption identification information indicates the encryption algorithm used by the content-transmitting device to encrypt the image frame, and wherein the decryption algorithm corresponds to the indicated encryption algorithm.

17. The method of claim 14, wherein encapsulating the encrypted image frame is based on a Real-time Transport Protocol (RTP), and wherein the method further comprises:

including in a corresponding RTP extension header for the encrypted image frame the encryption identification information for the image frame by setting extension bits of the corresponding RTP extension header.

18. The method of claim 14, wherein the encryption identification information indicates one or more of:

whether the image frame is encrypted; and the encryption algorithm used by the content-transmitting device to encrypt the image frame.

19. The method of claim 14, wherein inserting the encryption indicator into the image frame based on the predetermined condition involves setting a pixel point value at a predetermined position of the image frame, and wherein the predetermined condition is based on whether the pixel point value at the predetermined position of the image frame is consistent with a predetermined value.

20. The method of claim 14, wherein the encryption algorithm is one or more of:

a Data Encryption Standard (DES) algorithm;

a Triple Data Encryption Standard (3DES) algorithm;

a Rivest Cipher 2 (RC2) algorithm;

a Rivest Cipher 4 (RC4) algorithm;

an International Data Encryption Algorithm (IDEA) algorithm; and an Advanced Encryption Standard (AES) algorithm.

* * * * *